J. Leffel,

Water Wheel.

No. 3,168. Reissued Oct. 27. 1868.

Witnesses;
W. H. Whitney
J. R. Dodge

Inventor;
James Leffel
By Smith & Dodge
Attorneys

N. PETERS, PHOTO-LITHOGRAPHER, WASHINGTON, D. C.

UNITED STATES PATENT OFFICE.

JAMES S. GOODE AND JOHN W. BOOKWALTER, OF SPRINGFIELD, OHIO,
EXECUTORS OF THE ESTATE OF JAMES LEFFEL, DECEASED.

IMPROVEMENT IN WATER-WHEELS.

Specification forming part of Letters Patent No. 34,150, dated January 14, 1862; reissue No. 1,791, dated October 11, 1864; reissue No. 3,168, dated October 27, 1868.

DIVISION A.

*To all whom it may concern:*

Be it known that JAMES LEFFEL, of Springfield, in the county of Clarke and State of Ohio, has invented a new and useful Improvement in Water-Wheels; and we do hereby declare that the following is a full, clear, and exact description of the same, reference being had to the annexed drawings, making part of this specification, in which—

Figure 3:
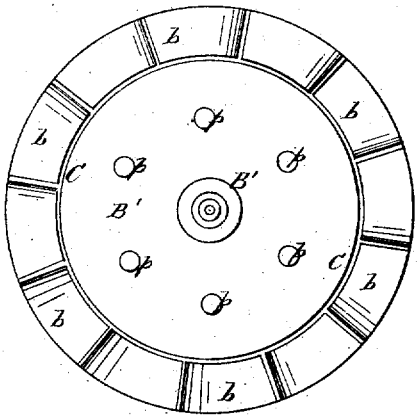
Figure 2:
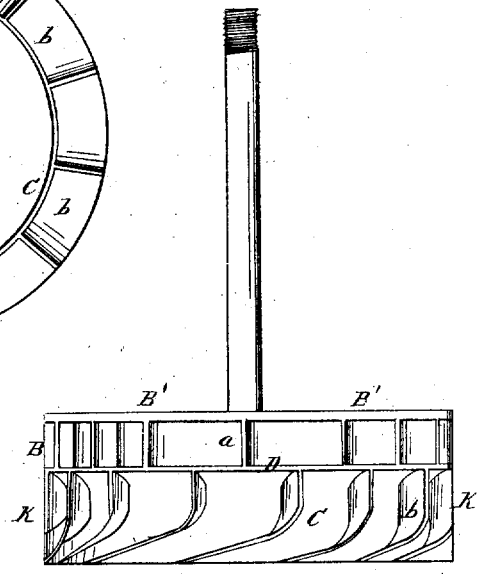
Figure 4:
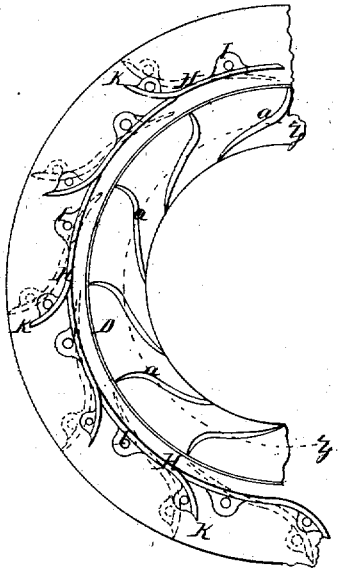
Figure 1:
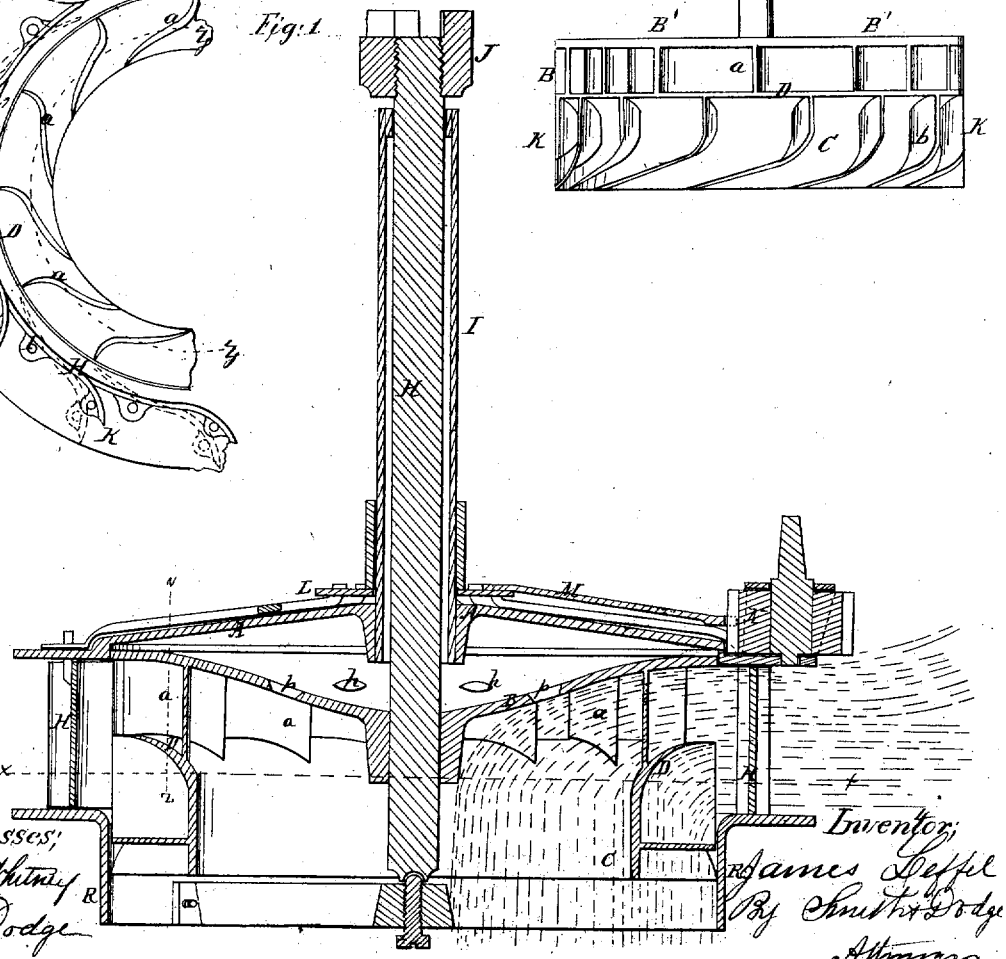

Figure 1 is a vertical section of the wheel and case. Fig. 2 is a side elevation of the wheel. Fig. 3 is a plan view of the wheel from below; and Fig. 4 is a top plan view of a portion of the wheel and case, with the top of each removed, so as to show the position of the upper tier of buckets, and of the gates in the casing surrounding the same.

The same letters are employed in all the figures for the indication of the same parts.

This invention consists in constructing a water-wheel with two series of buckets, both receiving the water horizontally, one series discharging the water vertically, and the other toward the center of the wheel; also, in the peculiar form given to the diaphragm, by which the lower and vertically-discharging buckets are separated from the upper centrally-discharging buckets.

In the annexed drawings, *a a* are the upper centrally-discharging buckets, and *b b* the lower vertically-discharging buckets. The upper buckets *a a* are of uniform size, consisting of vertical parallel vanes or floats, the form of which is shown clearly in Fig. 4. These buckets are in horizontal length about one-eighth of the diameter of the wheel. The water flowing through them is discharged into a central chamber, flowing thence through an air-tight tube leading to the surface of the tail-water, so that the draft of the column of water below the wheel shall be made available upon both sets of buckets, in conjunction with the weight of the column of water above the wheel, for utilizing the entire head, measured from the surface of the water in the fore-bay to the surface of water in the tail-race. The upper part of the wheel is covered by a plate, B, attached to the driving-shaft H. This plate is of uniform thickness, and is slightly convex on that portion nearest the periphery, which forms the upper side of the buckets *a*, and concave thence to the shaft, as is clearly shown in Fig. 1. This wheel is intended to be enclosed in a metallic case, of which A is the upper plate, entirely covering the wheel.

It is not necessary herein to describe this casing, as it will be fully set forth in another subdivision filed herewith.

The space between the plates B and A will ordinarily be filled with air; but to permit the escape of any water that may leak into that space, the plate B is perforated with holes *p*, to allow such water to escape. The two tiers or sets of buckets are separated by an annular diaphragm, D. The upper and outer edge of this diaphragm is on the same vertical plane with the edge of the plate B. It curves thence inward and downward, as shown in the drawings, to a point a little beyond the inner ends of the buckets *a*, and thence descends vertically to the bottom of the lower set of buckets *b*. The floats of the lower set of buckets are formed as clearly shown in Fig. 2. They are vertical at the top when attached to the under side of the curved diaphragm, and, extending downward, are curved, as shown. The general character of the buckets is similar to those of the Jonval turbine, their faces being radial, and they are attached to the diaphragm D. The issues of this set of buckets are formed between two corresponding floats, above and below, and between the diaphragm D, on the inside, and the tubular portion R of the casing. The buckets in both sets of wheels correspond in size with those of that set, and the two series of buckets have the same aggregate discharge.

The two parts may be cast together, or cast separately and bolted together, or the floats may be made of plates of wrought-iron or steel, cast into the other parts, or bolted thereto.

The wheel being placed in the bottom of a flume, and connected with the tail-water by a tube extending from the casing R, the water should be admitted to the wheel horizontally, being directed to the floats by guide-plates placed outside of the wheel, and, being deflected downward, be discharged vertically through said tube.

What we claim as the invention of the said JAMES LEFFEL, and desire to secure by Letters Patent, is—

1. A wheel having two series of buckets, both receiving the water horizontally, and one series discharging the water vertically, and the other toward the center, substantially as described.

2. The annular diaphragm D, constructed and arranged to operate in combination with the buckets above and below, substantially in the manner and for the purpose set forth.

In testimony whereof we have signed our names to this specification before two subscribing witnesses.

JAMES S. GOODE.
JOHN W. BOOKWALTER.

Witnesses:
R. MASON,
T. C. CONNOLLY.